(12) United States Patent
Venkataraman et al.

(10) Patent No.: US 8,005,194 B2
(45) Date of Patent: Aug. 23, 2011

(54) TECHNIQUE FOR HANDLING INCOMING REPLY MESSAGES

(75) Inventors: Raja Venkataraman, Sunnyvale, CA (US); Srikiran Prasad, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1495 days.

(21) Appl. No.: 11/339,311

(22) Filed: Jan. 24, 2006

(65) Prior Publication Data
US 2007/0143429 A1  Jun. 21, 2007

Related U.S. Application Data

(60) Provisional application No. 60/753,291, filed on Dec. 21, 2005.

(51) Int. Cl.
| H04M 11/00 | (2006.01) |
| H04M 1/64 | (2006.01) |
| H04M 3/42 | (2006.01) |

(52) U.S. Cl. ............. 379/88.13; 379/88.11; 379/210.01
(58) Field of Classification Search ................ 379/88.11
See application file for complete search history.

(56) References Cited

U.S. PATENT DOCUMENTS

| 5,708,655 | A |   | 1/1998 | Toth et al. |
| 5,844,967 | A | * | 12/1998 | Lee ............................. 379/88.23 |
| 5,901,211 | A |   | 5/1999 | Dean et al. |
| 5,943,401 | A | * | 8/1999 | Risner et al. ................ 379/88.22 |
| 5,991,290 | A | * | 11/1999 | Malik ........................... 370/352 |
| 6,055,305 | A | * | 4/2000 | Norman et al. .......... 379/211.01 |
| 6,055,510 | A |   | 4/2000 | Henrick et al. |
| 6,061,346 | A |   | 5/2000 | Nordman |
| 6,081,845 | A |   | 6/2000 | Kanemaki et al. |
| 6,219,413 | B1 |   | 4/2001 | Burg |
| 6,229,878 | B1 |   | 5/2001 | Moganti |
| 6,279,018 | B1 |   | 8/2001 | Kudrolli et al. |
| 6,304,636 | B1 |   | 10/2001 | Goldberg et al. |
| 6,304,753 | B1 | * | 10/2001 | Hartmaier ..................... 455/413 |
| 6,404,860 | B1 | * | 6/2002 | Casellini ..................... 379/88.17 |
| 6,430,271 | B1 |   | 8/2002 | DeJesus et al. |
| 6,442,263 | B1 |   | 8/2002 | Beaton et al. |
| 6,463,154 | B1 |   | 10/2002 | Patel |
| 6,484,036 | B1 |   | 11/2002 | Sorkin et al. |
| 6,516,202 | B1 |   | 2/2003 | Hawkins et al. |
| 6,532,368 | B1 |   | 3/2003 | Hild et al. |
| 6,608,637 | B1 |   | 8/2003 | Beaton et al. |
| 6,628,938 | B1 |   | 9/2003 | Rachabathuni et al. |
| 6,633,761 | B1 |   | 10/2003 | Singhal et al. |

(Continued)

FOREIGN PATENT DOCUMENTS

EP  0611239 A1  8/1994

(Continued)

OTHER PUBLICATIONS

U.S. Appl. No. 11/650,322, filed Jan. 5, 2007, Blight et al.

(Continued)

*Primary Examiner* — Joseph T Phan

(57) ABSTRACT

Messages are handled by a determination that an incoming message is in response to a previous outgoing message, where the previous outgoing message is sent from the computing device. The previous outgoing message is identified, as stored on the computing device. Data that indicates information relating to receiving the incoming message is provided with at least (i) a listing of the previous outgoing message, or (ii) a body of the previous outgoing message.

5 Claims, 3 Drawing Sheets

U.S. PATENT DOCUMENTS

| | | | |
|---|---|---|---|
| 6,647,108 B1 | 11/2003 | Wurster et al. | |
| 6,658,254 B1 | 12/2003 | Purdy et al. | |
| 6,671,735 B1 | 12/2003 | Bender | |
| 6,680,935 B1 | 1/2004 | Kung et al. | |
| 6,697,473 B2 | 2/2004 | Batten | |
| 6,751,453 B2 | 6/2004 | Schemers et al. | |
| 6,763,235 B2 | 7/2004 | Imai | |
| 6,768,789 B1* | 7/2004 | Wilk | 379/67.1 |
| 6,781,575 B1 | 8/2004 | Hawkins et al. | |
| 6,795,530 B1 | 9/2004 | Gilbert et al. | |
| 6,801,955 B2 | 10/2004 | Dunlap et al. | |
| 6,823,184 B1 | 11/2004 | Nelson | |
| 6,829,607 B1 | 12/2004 | Tafoya et al. | |
| 6,839,877 B2 | 1/2005 | Iwata | |
| 6,895,426 B1 | 5/2005 | Cortright et al. | |
| 6,928,305 B2 | 8/2005 | DeWald et al. | |
| 6,973,299 B2 | 12/2005 | Apfel | |
| 7,007,239 B1 | 2/2006 | Hawkins et al. | |
| 7,009,990 B1 | 3/2006 | Adams et al. | |
| 7,010,288 B2* | 3/2006 | Brown et al. | 455/412.1 |
| 7,013,130 B2 | 3/2006 | Ku | |
| 7,027,583 B2 | 4/2006 | Uranaka et al. | |
| 7,032,174 B2 | 4/2006 | Montero et al. | |
| 7,051,099 B2 | 5/2006 | Ziegler et al. | |
| 7,117,445 B2 | 10/2006 | Berger | |
| 7,124,370 B2 | 10/2006 | Fish | |
| 7,136,466 B1 | 11/2006 | Gao | |
| 7,139,555 B2 | 11/2006 | Apfel | |
| 7,151,952 B2 | 12/2006 | Nakatsuchi et al. | |
| 7,171,236 B2 | 1/2007 | Heo | |
| 7,190,975 B2 | 3/2007 | Rho | |
| 7,216,133 B2 | 5/2007 | Wu et al. | |
| 7,218,710 B1 | 5/2007 | Ali et al. | |
| 7,225,409 B1 | 5/2007 | Schnarel et al. | |
| 7,231,208 B2 | 6/2007 | Robertson et al. | |
| 7,231,229 B1 | 6/2007 | Hawkins et al. | |
| 7,233,813 B2 | 6/2007 | Kokubo | |
| 7,243,163 B1 | 7/2007 | Friend et al. | |
| 7,254,573 B2 | 8/2007 | Burke | |
| 7,286,649 B1 | 10/2007 | Nelson et al. | |
| 7,287,097 B1 | 10/2007 | Friend et al. | |
| 7,295,852 B1 | 11/2007 | Davis et al. | |
| 7,302,270 B1 | 11/2007 | Day | |
| 7,302,280 B2 | 11/2007 | Hinckley et al. | |
| 7,325,032 B2 | 1/2008 | Zuberec et al. | |
| 7,376,846 B2 | 5/2008 | Hawkins et al. | |
| 7,418,663 B2 | 8/2008 | Pettinati et al. | |
| 7,430,719 B2 | 9/2008 | Pettinati et al. | |
| 7,447,799 B2 | 11/2008 | Kushner | |
| 7,474,298 B2 | 1/2009 | Nguyen et al. | |
| 7,477,908 B2 | 1/2009 | Klassen et al. | |
| 7,502,849 B2 | 3/2009 | Roberts et al. | |
| 7,522,536 B2 | 4/2009 | Roberts et al. | |
| 7,522,913 B2 | 4/2009 | Kraft | |
| 7,543,243 B2 | 6/2009 | Schwatrz et al. | |
| 7,570,747 B2 | 8/2009 | Nakatsu | |
| 7,634,069 B2 | 12/2009 | Randall et al. | |
| 7,680,513 B2 | 3/2010 | Haitani et al. | |
| 2001/0003826 A1 | 6/2001 | Iwata | |
| 2001/0042100 A1 | 11/2001 | Guedalia et al. | |
| 2002/0016735 A1 | 2/2002 | Runge et al. | |
| 2002/0067714 A1 | 6/2002 | Crain et al. | |
| 2002/0118396 A1 | 8/2002 | Kawai | |
| 2002/0187794 A1 | 12/2002 | Fostick et al. | |
| 2003/0033582 A1 | 2/2003 | Klein et al. | |
| 2003/0046256 A1 | 3/2003 | Hugosson et al. | |
| 2003/0210260 A1 | 11/2003 | Palmer et al. | |
| 2004/0024846 A1 | 2/2004 | Randall et al. | |
| 2004/0203794 A1 | 10/2004 | Brown et al. | |
| 2004/0230494 A1 | 11/2004 | Lotvin et al. | |
| 2005/0043036 A1* | 2/2005 | Ioppe et al. | 455/456.1 |
| 2005/0043037 A1 | 2/2005 | Ioppe et al. | |
| 2005/0131992 A1 | 6/2005 | Goldstein et al. | |
| 2005/0188312 A1 | 8/2005 | Bocking et al. | |
| 2005/0198144 A1 | 9/2005 | Kraenzel et al. | |
| 2005/0201533 A1 | 9/2005 | Emam et al. | |
| 2005/0216949 A1 | 9/2005 | Candelora et al. | |
| 2005/0227740 A1 | 10/2005 | Orbach | |
| 2006/0015644 A1 | 1/2006 | Cernohous et al. | |
| 2006/0020615 A1 | 1/2006 | Keohane et al. | |
| 2006/0020993 A1* | 1/2006 | Hannum et al. | 725/111 |
| 2006/0041470 A1 | 2/2006 | Fiho et al. | |
| 2006/0129929 A1 | 6/2006 | Weber et al. | |
| 2006/0215829 A1 | 9/2006 | Schwartz | |
| 2006/0242109 A1 | 10/2006 | Pereira et al. | |
| 2006/0288297 A1 | 12/2006 | Haitani et al. | |
| 2006/0288298 A1 | 12/2006 | Haitani et al. | |
| 2007/0036286 A1* | 2/2007 | Champlin et al. | 379/67.1 |

FOREIGN PATENT DOCUMENTS

| | | |
|---|---|---|
| EP | 1117185 | 7/2001 |
| EP | 1503604 A2 | 2/2005 |
| KR | 1020060093183 A | 8/2006 |
| KR | 1020070078369 A | 7/2007 |
| WO | WO 98/48550 A1 | 10/1998 |
| WO | WO 99/26127 A1 | 5/1999 |
| WO | WO 01/50680 A2 | 7/2001 |
| WO | WO 2004/104789 A2 | 12/2004 |
| WO | WO 2005/111849 A2 | 11/2005 |

OTHER PUBLICATIONS

U.S. Appl. No. 11/786,550, filed Apr. 11, 2007, Stewart, William K.

Ghauri, Irfan et al. "Blind Channel Identification and Projection Receiver Determination for Multicode and Multirate Situations in DS-CDMA Systems", 2001 IEEE XP-002233922;pp. 2197-2200.

Tripathi, Vinayaik et al., "Multiple Access Interference Resistant Channel Acquisition for Wideband CDMA Signals", 2000 IEEE; pp. 956-960.

International Search Report and Written Opinion of the International Searching Authority in International Application PCT/US2006/030827, European Patent Office, Jan. 15, 2007, 15 pages.

Internet Telephony Manager (ITM) User Guide, XP002413107, Dec. 1, 1996, pp. 1-5.

Nokia 6630 User's Guide, XP002413106, Mar. 28, 2005, pp. 1-109.

Sharma, A.K., Juneja, D., and Bishnoi, C., Intelligent Agents in Call Management System, Integration of Knowledge Intensive Multi-Agent Systems International Conference, XP010793134, Apr. 18, 2005, pp. 9-14.

Annex to Form PCT/ISA/206 Communication Relating to the Results of the Partial International Search in International Application PCT/US2006/030826, Dec. 6, 2006, 4 pages.

Final Office Action mailed Dec. 16, 2008 in U.S. Appl. No. 11/200,510.

Final Office Action mailed Aug. 13, 2009 in U.S. Appl. No. 11/434,502, 29 pages.

Final Office Action mailed Jun. 17, 2010 in U.S. Appl. No. 11/200,511 10 pages.

Getting Started With Your PowerBook G4, pp. 1, 2, and 34, Copyright © 2002, Apple Computer, Inc., Cupertino, CA.

International Search Report and Written Opinion mailed out Jan. 29, 2009 PCT/US2008/074320 14 pgs.

International Search Report and Written Opinion of the International Searching Authority in International Application PCT/US2006/030979, European Patent Office, Jul. 17, 2007, 11 pages.

International Search Report and Written Opinion of the International Searching Authority in International Application PCT/US2006/030826, European Patent Office, Jan. 23, 2007, 21 pages.

Leih, A. Z., "Windows Mobile 5.0: Exposed!," Mar. 24, 2005, www.pocketnow.com/index.php?a=portal_detail&t=reviews&id=601.

Non-Final Office Action mailed Jun. 23, 2008 in U.S. Appl. No. 11/200,510.

Non-Final Office Action mailed Feb. 27, 2009 in U.S. Appl. No. 11/200,511, 7 pages.

Non-Final Office Action mailed Feb. 18, 2009 in U.S. Appl. No. 11/200,502.

Non-Final Office Action mailed Feb. 18, 2009 in U.S. Appl. No. 11/434,502.

Non-Final Office Action mailed Jul. 24, 2009 in U.S. Appl. No. 11/200,511, 12 pages.

Non-Final Office Action mailed Jan. 26, 2010 in U.S. Appl. No. 11/200,511 11 pages.
Non-Final Office Action mailed Aug. 19, 2009 in U.S. Appl. No. 11/200,502, 32 pages.
Notice of Allowance and Fees Due mailed Jan. 11, 2010 in U.S. Appl. No. 11/200,502 10 pgs.

PCT International Search Report and Written Opinion of the International Searching Authority in International Application PCT/US07/68906 Oct. 3, 2008, 17 pgs.

* cited by examiner

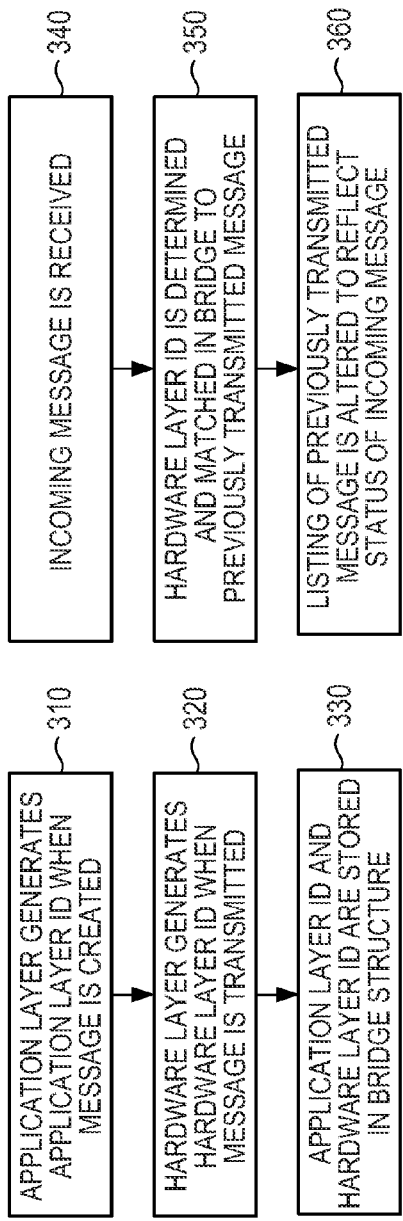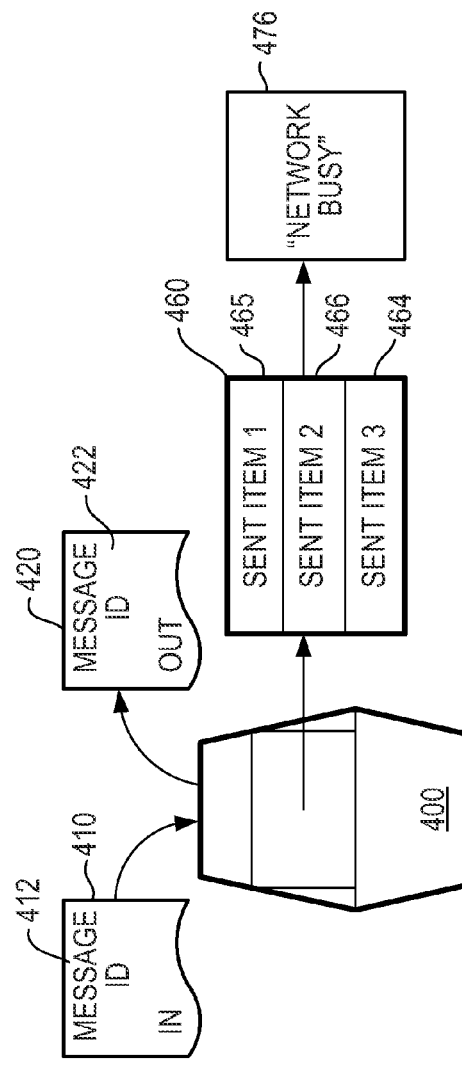

TECHNIQUE FOR HANDLING INCOMING REPLY MESSAGES

RELATED APPLICATION

This application claims benefit of priority to provisional U.S. Patent Application 60/753,291, filed Dec. 21, 2005; the aforementioned priority application being hereby incorporated by reference for all purposes.

TECHNICAL FIELD

The disclosed embodiments relate generally to the field of electronic messaging. In particular, the disclosed embodiments relate to a technique for handling incoming reply messages.

BACKGROUND

Mobile phone networks have traditionally been limited to voice communications, but new technologies such as GSM (Global System for Mobile Communications) have enabled mobile phone networks to also include data communications. For example, SMS (Short Message Service) messaging provides a software-independent protocol to send short text messages composed of either: 160-7 bit characters; 70-16 bit characters; or 140 octets of binary data. Individual SMS messages thus require a relatively small network bandwidth and devices can receive messages, even when connected to a voice call. The number of SMS messages a user receives has continually increased because many new types of network devices have joined mobile phone networks. These devices include, for example, PDAs, hybrid PDA/mobile phone devices, and other text messaging devices using GSM networks. Additionally, PSTN devices also exist that support messaging applications such as SMS.

Numerous other types of messaging exist on such mobile devices. For example, email and Multimedia Message Service (MMS) are alternative types of messages available on many mobile devices.

BRIEF DESCRIPTION OF THE DRAWINGS

FIGS. 3A and 3B illustrate methodologies, under one or more embodiments, for generating outgoing messages, and handling incoming reply messages to the outgoing messages respectively.

FIG. 4 illustrates a mobile computing device, configured to handle incoming reply messages, according to an embodiment of the invention.

DETAILED DESCRIPTION

Figure 1:
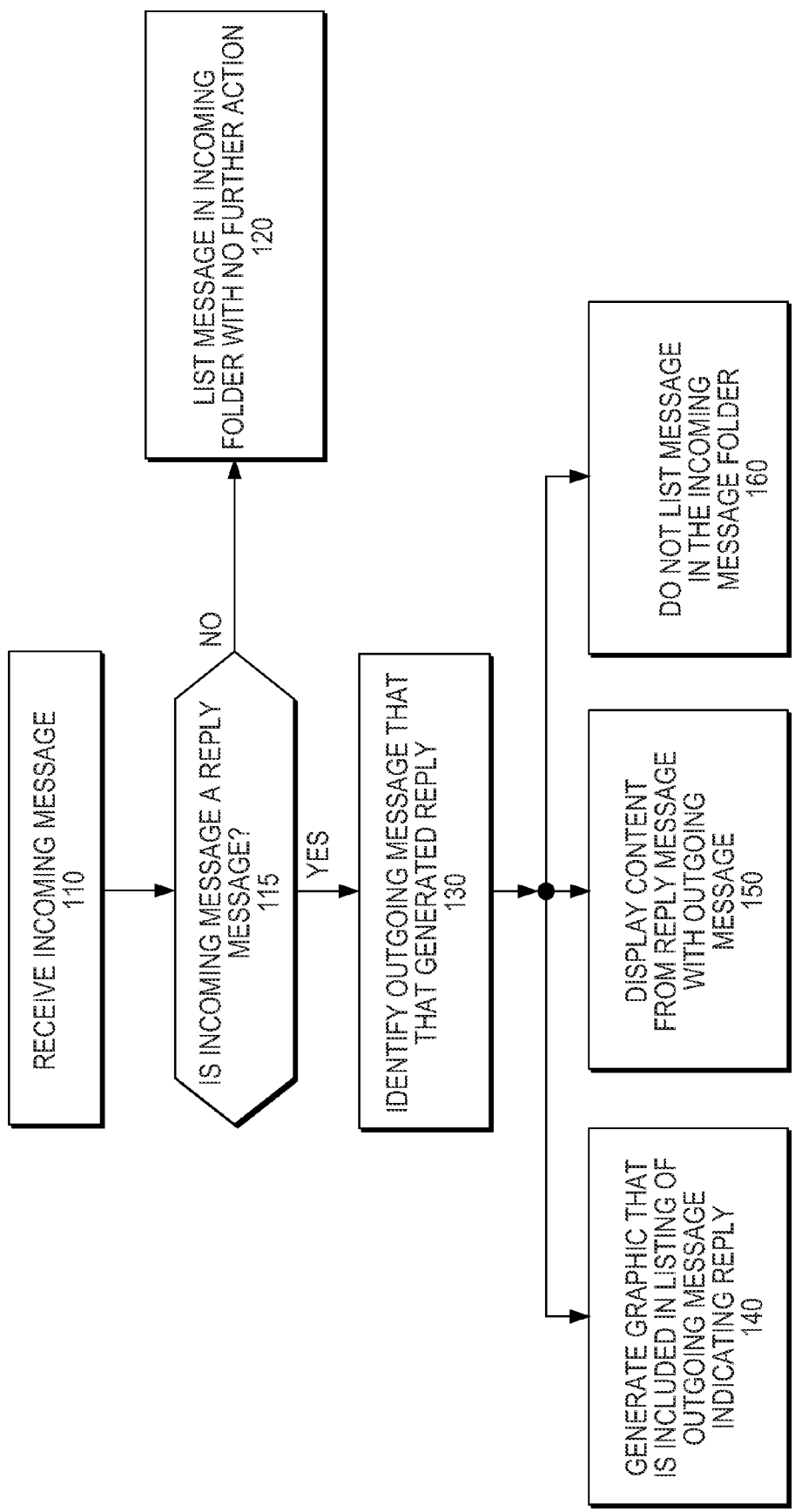
FIG. 1 illustrates a method for handling incoming reply messages, under an embodiment of the invention.

Embodiments described herein provide a technique for reducing clutter in an incoming message folder (sometimes called an "inbox") by automatically combing certain response or reply messages with an outgoing message that generated the response or reply message. According to one embodiment, an incoming message is identified as a reply message, and information contained in that reply message is used to alter the display of the outgoing message that generated the reply message. Sill further, a graphic feature may be associated or displayed with the outgoing message that generated the reply message, where the graphic feature is representative of a state or content of the message. The outgoing message may be altered in how it is listed or presented so as to provide the graphic feature.

In one embodiment, reply messages that are recognized for purpose of being combined with outgoing messages are acknowledgements of successful/failed delivery, or other forms of messages that carry delivery status information. In one embodiment, the reply messages that are handled include acknowledgements or other messages that provide delivery status, and such messages originate from a third-party (e.g. a wireless carrier of the device on which the outgoing message was generated). Alternatively, such messages may be generated by the intended recipient.

As used in this application, the term "response" and "reply message" are interchangeable, and refer to messages that are responsive to another original message. Response or reply message may originate from an intended recipient of the message or from a third-party that was involved in the handling of the message. In one embodiment, the reply message is an acknowledgement message that, originating from a third-party (e.g. not the recipient) that confirms or communicates delivery status of the originating message.

According to an embodiment, messages are handled by a determination that an incoming message is in response to a previous outgoing message, where the previous outgoing message is sent from the computing device. The previous outgoing message is identified, as stored on the computing device. Data that indicates information relating to receiving the incoming message is provided with at least (i) a listing of the previous outgoing message, or (ii) a body of the previous outgoing message.

A specific type of messaging contemplated by one or more embodiments is Short Message Service (SMS) messaging. In come cases, newly transmitted SMS message may return to the user a programmatically generated acknowledgement from another source. For example, some wireless carriers always generate an acknowledgement SMS message when the user transmits his own SMS message. The acknowledgement message may include delivery status information or data indicating whether the original outgoing message was successfully received or not. Such acknowledgement messages may be generated each time an SMS message is sent from a device, even if the device is sending messages when participating in a chat thread. The result is that the acknowledgements clutter the user's inbox. Under one or more embodiments described herein, such acknowledgements may be removed from the inbox, and represented alternatively (e.g. in graphic form) with the message in another folder (e.g. "sent items" folder).

Under embodiments described herein, SMS acknowledgement messages are not listed, but rather represented graphically in association with the original outgoing message in a manner that indicates the acknowledgement was received. The graphic representation of the acknowledgement message may indicate the content of the acknowledgement message. For example, in the example provided, the acknowledgement message may carry indications of whether the outgoing message was successfully received or not. According to an embodiment, a graphic feature indicating success or failure of the outgoing message may be presented with the listing of the outgoing message.

According to an embodiment, a message listed in an incoming message folder may be identified, where the identified message is a reply to a previous outgoing message. The previous outgoing message listed in an outgoing folder may be identified. A feature representing the message for display with a listing of the previous outgoing message may be generated and displayed with the listing of the identified outgoing message.

In one embodiment, the listing of the identified incoming message is removed from the incoming message folder once the feature is generated in the outgoing folder.

Furthermore, one or more embodiments may include monitoring for receipt or storage of an incoming message that is a reply to a previous outgoing message. In response, the feature representing the message may be generated automatically.

According to an embodiment, the generated feature may represent a content of identified message listed in the incoming message folder. In one embodiment, the identified message may correspond to a confirmation message, and the feature generated for display with the listing of the previous outgoing message represents whether that outgoing message was received (confirmation) or not received (non-confirmation).

As used herein, messages may include text or media messages transmitted over data networks or telephony networks. One implementation provides for messages to include email messages, which are typically exchanged over data channels and between servers that operate under email protocols such as POP3 or IMAP. Another implementation provides for messages to include SMS messages, which are transmitted as text over telephony networks, and can be rendered instantly on receipt by the receiving device. Still further, Multimedia Message Service (MMS) and Instant Messaging formats/protocols are also contemplated.

The term "reply message" means any message that is generated or made in response to another message. The reply message may be generated by either a third-party or by the recipient of the message that is replied to. As an example, embodiments are described below in which the reply messages correspond to SMS acknowledgements, each of which may be generated by a carrier that handles the original outgoing SMS message (rather than the recipient or recipient device of the message).

Numerous types of computing devices may be used with embodiments described herein. As mentioned, one type of computer telephony device for use with an embodiment is a wireless, mobile computing device, sometimes called the "smart phone" or hybrid devices. Such devices are generally small enough to fit in one hand, and provide cellular telephony features in combination with other applications, such as contact applications for managing contact records, calendar applications for managing and scheduling events, task applications for keeping lists, and camera applications for capturing images. Many types of messaging transports may be provided on such mobile computing devices, including SMS, MMS, email and instant messaging.

Other types of computing devices are contemplated for use with one or more embodiments described herein. Such computing devices include a desktop computer, laptop, personal digital assistant (PDA) or other computing device that can support messaging and messaging applications.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

Additionally, or more embodiments described herein may be implemented using modules. A module may include a program, a subroutine, a portion of a program, or a software component or a hardware component capable of performing one or more stated tasks or functions, or alternatively, a hardware component configured through software or other programmatic elements. As used herein, a module can exist on a hardware component independently of other modules, or a module can be a shared element or process of other modules, programs or machines.

The use of terms such as "component" or "element", when presented in the context of software or programming, may refer to code that can be executed to perform a stated function or task. Such code may execute or be shared with other components or elements, even when a component or element is described or shown to be disparate from other components.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

According to another embodiment, a transmission of an outgoing message to a plurality of intended destinations is recorded. Subsequently, one or more incoming messages are determined to be in response to the outgoing message. Each of the one or more incoming messages may include delivery status information for the outgoing message as transmitted to one or more of the plurality of intended destinations. A graphical data representation may be generated that indicates information relating to the delivery status of the outgoing message as transmitted to all of the plurality of intended destinations, based on the delivery status information of each of the one or more incoming messages.

Overview

FIG. 1 illustrates a method for handling incoming reply messages, according to an embodiment of the invention. A method such as described may be implemented on a computing device for various kinds of messages, including SMS messages or even emails.

In step 110, an incoming message is received on a computing device that executes a messaging application. In an embodiment, the incoming message is an email, received across a cellular network or the Internet. In another embodiment, the message is an SMS message, received over, for example, a wireless cellular network. Other implementations and types of messages are contemplated.

In one implementation, the computing device includes an operating system, one or more messaging applications, and an interface for communication hardware. For example, the computing device may correspond to a wireless telephony device, and the communication hardware may correspond to a radio for transmitting and receiving data over cellular networks. In such an example, the operating system may correspond to a mobile OS, such as PALM OS, manufactured by ACCESS INC. or WINDOWS MOBILE, manufactured by the MICROSOFT CORPORATION.

Step 115 provides that a determination is made as to whether the incoming message is a reply message. In the SMS messaging context, for example, the incoming message will have an identification. As described with embodiments below, the incoming message identification may be used to identify the message is response or reply to a previous outgoing message. For example, the identification may be numerical in nature, and carried in the body or header of the incoming message. Alternatively, the identifier may have its own field in the incoming message.

In another embodiment, features or aspects of the incoming message, other than identification embodied in the message, may be used in making the determination that the incoming message is a reply message. In one embodiment, for example, the incoming message may be identified as a reply message through the words or text string carried in the subject line of the message. For example, the appearance of "re:" in the subject line may denote that the incoming message is a reply to another message that has the same remainder in the subject line. Still further, the original outgoing message may carry an identifier (e.g. numerical, time stamp) generated on the device making the transmission, and the incoming message may provide the entire outgoing message, including the identifier. Numerous other alternatives or context is possible.

If the incoming message is not a reply message, then step 120 provides that the incoming message is listed in the incoming message folder, with no further action.

If the incoming message is determined to be a reply message, step 130 provides that the outgoing message that generated the reply is identified. As described above, for example, this outgoing message may have the same identifier (as is the case of SMS messages), or the same subject line in the case where the messages are emails.

Once the reply message is identified, numerous implementation options exist. FIG. 1 illustrates an embodiment in which identification of the original outgoing message may be combined with performance of one or more acts, such as described with steps 140-160. In step 140, a graphic is generated and included with the listing of the outgoing message. For example, the graphic may be provided with the item when it is listed or displayed with a folder. As an alternative or addition, the graphic may be included in the outgoing message.

As an alternative or addition to an implementation in which step 140 is performed, step 150 provides that content from the reply message is indicated or displayed with the outgoing message, or at least its listing. For example, if the incoming reply message is an acknowledgement that indicates a positive response (e.g. successful transmission or receipt of the previous outgoing message), one embodiment may provide for a green symbol representative of the positive response to be provided within the outgoing message. Alternatively, such a feature may be listed adjacent to the message as listed in, for example, the "sent items" folder. Still further, text lines in the reply message may be copied and included in the outgoing message that generated the reply.

As another alternative or addition, step 160 provides for the incoming message to be excluded from being listed as a new message in, for example, an inbox. In one embodiment, the incoming message may be deleted entirely if the content of indication provided by the message is carried into the outgoing message that generated the reply. Alternatively, the incoming message may be archived, or moved into a folder that is apart from the inbox. In either case, if the message is a reply message, the incoming message may be ignored, or combined (such as through conversion to graphics or copying of text or other content from that message) with the outgoing message, such that a message or content carried in that incoming message is carried by the outgoing message.

Incoming Reply Messages with Radio-Level Identifiers

Figure 2:
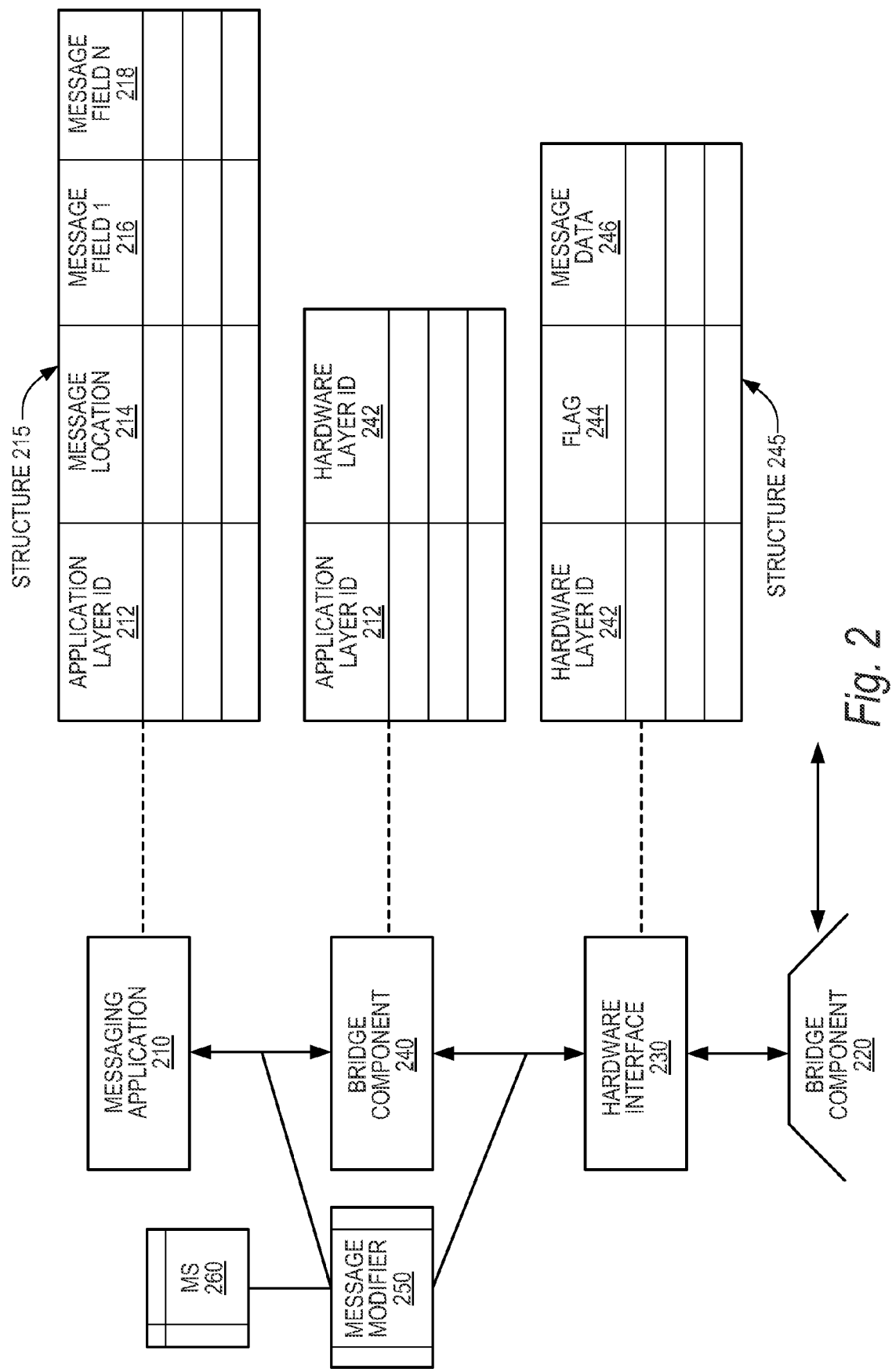
FIG. 2 is a simplified block diagram of a system that is configured to handle incoming reply messages with radio-level identifiers, according to one or more embodiments of the invention.

FIG. 2 is a simplified block diagram of a system that is configured to handle incoming reply messages with radio-level identifiers, according to one or more embodiments of the invention. A system such as shown by FIG. 2 assumes messaging through wireless transports, such as provided on smart phones and cellular messaging devices. Such devices may communicate data through use of radio-hardware for transmitting radio-frequency signals. In such context, SMS messaging is an example of a type of messaging on which radio-level identification may be presented.

A system such as shown by FIG. 2 may include a messaging application 210, radio-hardware components 220, and a hardware interface 230. The hardware interface may include programmatic elements, such as low-level code, that manages communications to and from the hardware components 220. The messaging application 210 may execute over an operating system (not shown) and provide user-interface features, such as a display on which messages may be viewed, composed or managed. An example of a messaging application for use with one or more embodiments is an SMS application for the WINDOWS MOBILE environment. In an embodiment, SMS messages may be composed with the messaging application 210, then transmitted through the hardware interface 230 and hardware components 220. For outgoing messages, a message is provided an application layer identifier 212 by the messaging application 210. Additionally, the hardware interface 230 (or other component) provides an outgoing message with a hardware layer identifier 242. Incoming SMS messages also include identifiers that can be used by the hardware components 220 and/or the hardware interface 230. The assignment and use of such identifiers is part of existing SMS messaging protocol.

One or more embodiments utilize the fact that incoming SMS reply messages typically carry the hardware layer identifier 242 of the original outgoing message. In order to identify an incoming message as a reply message, and associate that message with a previously transmitted outgoing message, one or more embodiments provide for use of a bridge component 240 that can cross-reference the hardware layer identifier 242 with the application layer identifier 212.

FIG. 2 illustrates additional detail of how application layer identifiers 212 and hardware layer identifiers 242 may be used on a device on which SMS messages are handled. The messaging application may maintain a table 215 or similar structure that relates the application layer identifier 212 to one or more properties of the individual messages. In an example provided, the table 215 may associate the application layer identifier 212 with a message location 214, and one or more message fields 216, 218. Examples of message fields include contents of the "TO" and "FROM" field, as well as contents from the body of the message. Numerous characteristics and properties of the SMS message may be maintained by the table 215.

Likewise, the hardware layer identifier 242 may be maintained in a separate structure 245 that relates the hardware layer identifier to characteristics of an incoming or outgoing SMS message. Incoming reply SMS messages that are acknowledgements often carry certain properties, such as flags 244 and message data 246. The message data 246 may convey an acknowledgement value (e.g. "success" or "failure"). In the case of acknowledgements, the incoming messages may include message data 246 in the form of error codes or pass codes. These characteristics of the SMS message may be identified and stored in the structure 245 as shown.

As mentioned, embodiments described herein provide for incoming messages to be identified as reply messages, and then combined or otherwise presented with the outgoing message. In the SMS example provided by FIG. 2, an outgoing message is (i) composed or otherwise created by the application 210, (ii) provided the application layer identifier 212 by the application 210, (iii) communicated to the hardware components 220 via the hardware interface 230, (iv) provided the hardware layer identifier 242, and (v) then transmitted from the device to a intended recipient (person or messaging address(es) of a person) or destination (e.g. address destination). At the application layer, the application layer identifier 212 is stored in the structure 215, along with other characteristics or properties (e.g. message location or folder 214, fields 216, 218). At the hardware layer, the hardware layer 242 is stored in the structure 245, possibly with other fields such as message data 246. An incoming message may be (i) received by the hardware components 220, (ii) have its hardware layer identifier 242 identified, and (iii) processes or rendered by the messaging application 210.

Under standard implementation, components such as the hardware interface 230 have access to an incoming messages hardware layer identifier 242, but not to the application layer identifier 212. Likewise, the application 210 may be able to use the application layer identifier 212, but not the hardware layer identifier 242. Accordingly, embodiments of the invention provide that the bridge component 240 relates the application layer identifier 212 to the hardware layer identifier 242. According to an embodiment, the bridge component 240 may be coupled to the messaging application 210 and to the hardware interface 230. The bridge component 240 may intercept or receive each of the application layer identifiers 212 and hardware layer identifiers 242.

Since SMS reply messages (particularly acknowledgement messages) have the same hardware layer identifier 242 as that generated for the original outgoing message to which the reply is made, the bridge component 240 may use the hardware layer identifier 242 of any new incoming message to identify a match to other messages with the same hardware layer identifier 242. For example, if a match is identified, the associated application layer identifier 212 is determined for the matched message. The structure 215 is then used to identify the original outgoing message, including the location of that message and its contents and headers etc. For example, the original message may reside in a Sent Item folder, or an archive folder, and have a body, subject line and address line. Once the application layer identifier 212 is identified, such information may be retrieved from the table 215. The structure 245 may be used to identify information from the incoming reply message.

In one embodiment, a message modifier component 250 may use information from table 215 to modify or alter the presentation, rendering or listing of an outgoing message that is identified as being the source of the reply message. The message modifier 250 may access a message store 260 to identify the original message that is the source of the incoming reply message. For example, the original outgoing message may be listed or rendered in whole or in part in a particular folder. In one embodiment, the message modifier component 250 may then use information from the matching incoming reply message, as carried in the structure 245, to generate a graphic that is indicative of the message data 246 or content, and to associate that graphic with the outgoing message. For example, the incoming message may carry delivery status information, indicating whether the previous outgoing message was successfully received by the intended recipient or at the intended destination. Accordingly, an acknowledgement SMS message that indicates the message was received may have no error code, and have text or a flag value that indicates the message was successfully transmitted. In such a case, the message modifier 250 may present a graphic in association with the listing or body of the original outgoing message, indicative of the successful transmission. The listing of the message may be an abbreviated rendering of the message, such as by subject line or other header or address information. Likewise, an acknowledgement message may have an error code and/or a flag value that is indicative of an unsuccessful transmission. In such cases, the graphic generated by the message modifier 250 may represent the outgoing message to have been unsuccessfully transmitted.

As an alternative, the message modifier 250 may display other information, including text. Furthermore, under one embodiment, the information may be presented interactively. For example, the information may represented graphically, and the graphic feature may be selectable to present text corresponding to, for example, the error code presented with message data 244.

Depending on the implementation, message modifier 250 may be functionality provided with one or more of the following components: application 210, operating system (not shown), bridge 240. Alternatively, the message modifier 250 may be provided as an independent component.

An embodiment such as shown by FIG. 2 may be used to handle reply acknowledgement SMS messages. Such messages are automatically generated by some wireless carriers, such as VERIZON, in response to a user transmitting an outgoing SMS message. The acknowledgements may originate from the carriers, or from carrier resources, but not from the recipients of the original outgoing message, and serve to inform the user that the SMS message was successfully or unsuccessfully transmitted. While the status information may be important, the presence of such acknowledgements provide clutter to the user's SMS inbox. Further, when one message is addressed to multiple recipients, multiple acknowledgements are received. In such cases, it is difficult for the user to tell the different acknowledgements apart. Embodiments described herein enable the acknowledgements to be combined with the original outgoing message, so that if the user wishes to see what the acknowledgement message contained, the user needs only to look at the original outgoing message (usually in the Sent Items folder). In one embodiment, the outgoing message is sufficiently modified in appearance (through graphics or otherwise) to enable the user to glance at it and see the confirmation. Because the incoming acknowledgement can be combined with the outgoing message, an embodiment enables reply acknowledgements to be completely removed from the inbox or other incoming message folder.

Methodology

FIGS. 3A and 3B illustrate methodologies, under one or more embodiments, for generating outgoing messages, and handling incoming reply messages to the outgoing messages respectively. Methods such as described with FIGS. 3A and 3B may be implemented using a system such as described with FIG. 2. Reference to elements and numerals of FIG. 2 may be made to illustrate a suitable element or component for performing a step or sub-step of a method being described.

In FIG. 3A, step 310 provides that an outgoing message is generated by the application layer (e.g. messaging application 210) generating an application layer identifier (e.g. identifier 212) for a newly created or composed message. Step 320 provides that the hardware layer identifier (e.g. identifier 242) is generated for the message at the hardware layer. In step 330, a bridge component (such as shown by bridge component 250) or equivalent thereof stores the application layer identifier and the hardware layer identifier.

FIG. 3B, an incoming message is received by the hardware components (e.g. 220) in step 340. The bridge component 250 matches the hardware layer identifier of the incoming message with the hardware layer identifier of a previous outgoing message 350. The application layer identifier may then be determined by the reference data maintained by the bridge component 250. Once the application layer identifier is determined, step 360 provides that listing (or rendering) of the previously sent outgoing message is modified, with for example, graphics and text, to represent a message or code carried by the incoming reply message. In the case of SMS acknowledgements, for example, the message or code may signify delivery status (e.g. the message was successfully/unsuccessfully received).

Accordingly, the modification to a previously sent outgoing message may be a graphic and/or text item indicating either (i) the previous outgoing message was successfully transmitted, or (ii) the previous outgoing message was not successfully transmitted. In the latter case, the message may be viewed, opened or otherwise manipulated to display, for example, the error code underlying the reason of the failure (e.g. "network was busy").

Device Illustration

FIG. 4 illustrates a mobile computing device for use with one or more embodiments of the invention. In particular, an embodiment provides that the device 400 shown by FIG. 4 is configured to handle incoming reply messages, according to embodiments such as described. According to one embodiment, device 400 may include as hardware, one or more processors, memory resources, and radio transmitters and receivers to enable the device to communicate over cellular telephony networks. For purpose of illustration, device 400 is assumed to handle SMS reply messages, as described with one or more embodiments described above.

Accordingly, device 400 may be configured to include, for example, bridge component 250 for (i) match the hardware layer identifier 412 of an incoming message 410 with the hardware layer identifier 422 of a previously sent message 420 in order to identify the incoming message as being an acknowledgement reply (or other form of reply) to that previously sent message; (ii) associate the matching hardware layer identifier 412 of the incoming message (now determined to be a reply) to the application layer identifier (not shown in FIG. 4) of the previously sent message 420 (for which the reply was generated); (iii) locate the previously sent message having the identified application layer identifier using a structure or table provided by or with the messaging application; (iv) modify the located rendering or listing of the located message to indicate the contents of the reply message. For example, in an embodiment in which the reply message is a carrier-generated reply notification, the originally transmitted message may be modified to indicate that the message was successfully/unsuccessfully transmitted and received.

In FIG. 4, Sent Item folder 460 is shown in which one or more outgoing messages 456 or listed. As an example, a graphic 465, 466 is presented with each message indicating whether the message was successfully/unsuccessfully transmitted and received. In the example provided, a successful transmission may be indicated by a check mark, and an unsuccessful transmission may be communicated by an "X". Further, if the user was to open one message, additional information may be viewed regarding the reply message. In the example shown, the error code 476 of an unsuccessful message is shown. As an alternative, the graphic can be separately opened from the outgoing message to view the error code or other content of the incoming reply message.

Multiparty Messaging

Messaging applications allow users to address multiple parties at one time, using the body of a single message. In examples such as provided above with SMS messaging, a transmission to multiple parties may (for certain wireless carriers) receive multiple responses. Different protocols may be used to indicate whether a message was successfully transmitted if some, but not all of the recipients successfully received the messages. In one embodiment, the message is marked with graphics or otherwise as having failed to be successfully transmitted if just one recipient did not successfully receive the message. The user may view the sent items in order to see additional information as to which recipients did receive a message successfully.

Under an embodiment, the bridge component 250 may handle multi-party messages by associating application layer identifiers to hardware layer identifiers, as described above. With a multi-party message, an outgoing message may have one application layer identifier and multiple hardware layer identifiers. For example, for an outgoing message addressed to two people, the following may apply:

| APP LAYER ID | HARD LAY ID |
|---|---|
| 1 | 1001 |
| 1 | 1002 |

The above shows one message composed to two people may, at the application layer, be assigned one application layer identifier, but be assigned two hardware layer identifiers (as two messages are actually sent). Acknowledgements to each may carry corresponding hardware layer identifiers, and return acknowledgements to each may map to the same application layer identifier. Thus, two acknowledgements may be compiled for one composed message addressed to two people, and the listing or rendition of that outgoing multiparty message may be modified based on the combined acknowledgements.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A system for enabling a computing device to handle messages, the system comprising:
   a bridge component configured to: (i) record application layer identifiers generated by one or more applications for newly created messages, (ii) record hardware layer identifiers for each message generated by the one or more applications transmitted from the computing device, and (iii) record data relating each hardware layer identifier to a corresponding application layer identifier;

wherein for an incoming message, the bridge component is configured to perform or enable: (i) identification of the hardware layer identifier of the incoming message, (ii) determination of any previous outgoing message that has a corresponding hardware layer identifier, (iii) determination of the application layer identifier of the previous outgoing message, and (iv) identification of a location of the previous outgoing message using the application layer identifier;

a message modifier component that modifies at least a listing or a body of the previous outgoing message based on information provided by the incoming message;

wherein the message modifier generates a graphic feature to indicate the information provided by the incoming message, the graphic feature being displayed with either the listing or the body of the previous outgoing message; and wherein the graphic feature indicates a delivery status of the previous outgoing message.

2. The system of claim 1, wherein the bridge component is configured to record application layer identifiers and hardware identifiers generated by a Short Message Service (SMS) messaging application.

3. The system of claim 1, wherein the bridge component is configured to record application layer identifiers and hardware identifiers generated by an email application.

4. The system of claim 1, wherein the bridge component is configured to record application layer identifiers and hardware identifiers generated by a Multimedia Messaging Service (MMS) application.

5. The system of claim 1, wherein the bridge component is configured to record application layer identifiers and hardware identifiers generated by an Instant Messaging application.

* * * * *